United States Patent
Zhang et al.

(10) Patent No.: US 11,724,940 B2
(45) Date of Patent: Aug. 15, 2023

(54) METHOD FOR FORMING GRAPHENE FILM THROUGH HORIZONTALLY TILING AND SELF-ASSEMBLING GRAPHENE

(71) Applicant: XI'AN JIAOTONG UNIVERSITY, Xi'an (CN)

(72) Inventors: Jinying Zhang, Xi'an (CN); Jialiang Huang, Xi'an (CN); Yehe Shi, Xi'an (CN); Xuewen Zhao, Xi'an (CN); Yonghong Cheng, Xi'an (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 233 days.

(21) Appl. No.: 17/043,702

(22) PCT Filed: Nov. 14, 2018

(86) PCT No.: PCT/CN2018/115441
§ 371 (c)(1),
(2) Date: Sep. 30, 2020

(87) PCT Pub. No.: WO2020/093426
PCT Pub. Date: May 14, 2020

(65) Prior Publication Data
US 2021/0253433 A1 Aug. 19, 2021

(30) Foreign Application Priority Data
Nov. 6, 2018 (CN) .......................... 201811314339.3

(51) Int. Cl.
*C01B 32/194* (2017.01)
(52) U.S. Cl.
CPC ........ *C01B 32/194* (2017.08); *C01B 2204/04* (2013.01); *C01B 2204/22* (2013.01); *C01P 2006/40* (2013.01)

(58) Field of Classification Search
CPC ... C01B 32/182; C01B 32/184; C01B 32/194; C01B 2204/04; C01B 2204/22; C01P 2006/40; B82Y 40/00
See application file for complete search history.

(56) References Cited

FOREIGN PATENT DOCUMENTS

| CN | 103708443 A | 4/2014 |
| CN | 104592535 A | 5/2015 |

(Continued)

OTHER PUBLICATIONS

Chen, Xianjue, et al. "Template-free assembly of three-dimensional networks of graphene hollow spheres at the water/toluene interface." Journal of colloid and interface science 430 (2014): 174-177.*

(Continued)

*Primary Examiner* — Richard M Rump
(74) *Attorney, Agent, or Firm* — W&G Law Group

(57) ABSTRACT

The present invention provides a method for forming a graphene film through horizontally tiling and self-assembling graphene, including: proportionally adding toluene and alcohol into a graphene aqueous solution to be fully and uniformly mixed; then pouring the mixture into a vacuum filtration device, wherein when a solution in a filter flask forms a layered solution system with upper and lower layers, graphene is confined at an interface and tiled horizontally under a shear force at the interface to allow (002) planes of graphene to gradually become parallel to the interface, and graphene to be self-assembled to form the graphene film; and activating the suction filtration device to remove the solution, to obtain a graphene film with the (002) planes parallel to each other at a microscopic level on a filter paper.

8 Claims, 2 Drawing Sheets

(56) References Cited

FOREIGN PATENT DOCUMENTS

| CN | 105254920 A | | 1/2016 | |
|---|---|---|---|---|
| CN | 106943896 A | * | 7/2017 | ......... B01D 67/0079 |
| WO | 2017213045 A1 | | 12/2017 | |

OTHER PUBLICATIONS

Phillipson, Roald, et al. "Tunable doping of graphene by using physisorbed self-assembled networks." Nanoscale 8.48 (2016): 20017-20026.*

International Search Report (PCT/CN2018/115441); dated Jun. 3, 2019.

"Synthesis and Structural Characterization of Single-and Bi-layer Graphene" Cui, Yizhi et al. [Aug. 31, 2014] Considered on abstract only.

* cited by examiner (a) (b)

METHOD FOR FORMING GRAPHENE FILM THROUGH HORIZONTALLY TILING AND SELF-ASSEMBLING GRAPHENE

CROSS-REFERENCE TO RELATED APPLICATIONS

This is the United States national phase of International Patent Application No. PCT/CN2018/115441, filed on Nov. 14, 2018, which claims priority of Chinese patent application No. 2018113143393 filed on Nov. 6, 2018, the entire contents of which are incorporated herein by reference in their entireties.

TECHNICAL FIELD

The present invention relates to the technical field of preparation of new energy materials, and in particular, to a method for forming a graphene film through horizontally tiling and self-assembling graphene.

BACKGROUND

Graphene is widely used in transparent conductive films, electromagnetic shielding films, heat conduction and heat dissipation films and other research fields due to its outstanding physical and chemical properties and unique two-dimensional structure of a single atomic layer. Chen's research group prepared an rGO film by spin coating combined with thermal reduction, and this material can be used as a conductive transparent electrode (ACS Nano, 2008, 2: 463-470). Mullen's research group assembled GO onto a quartz slice by dip coating, and obtained an rGO film which can be used as a transparent conductive electrode by thermal reduction (Nano Lett, 2008, 8: 323-327). Zheng's research group prepared an ultra-thin and flexible graphene film by volatilization-induced self-assembling combined with high-temperature annealing graphitization (AdvFunct Mater, 2014, 24: 4542-4548). The film exhibits excellent electromagnetic shielding efficiency up to 20 dB and excellent thermal conductivity up to 1100 $Wm^{-1}K^{-1}$.

Therefore, the film forming technology of graphene films is particularly important. Among them, the related research work on the control of building the micro-assembly structure of graphene as the basic element still needs to be supplemented and improved.

At present, the main preparation methods of graphene films can be divided into direct methods and indirect methods. Direct methods include epitaxial growth of silicon carbide or metal surface, chemical vapor deposition (CVD), and so on. Although graphene films with good quality and stable performance can be obtained by the direct methods, the requirements for equipment are high, and it is often difficult to transfer the obtained films to other substrates, so it is not easy to realize large-scale application. The indirect methods include vacuum filtration, spraying, spin coating, electrophoresis, self-assembling and so on. The indirect methods, which prepare graphene first and then form films, do not need complicated equipment and have a low cost, so it is easy to realize large-scale application.

(1) Vacuum Filtration

The ordinay vacuum filtration method includes adjusting the concentration of a graphene/graphene oxide aqueous solution to a desired concentration, and then carrying out rapid vacuum filtration. If the thickness of the prepared film is large, the film can be transferred directly; if the film thickness is small, a solvent can be used to dissolve the filter paper first, and then transfer it to a suitable substrate. Eda et al. vacuum-filtered different volumes of graphene oxide aqueous dispersions with a mixed cellulose ester film to obtain a graphene oxide film on the mixed cellulose ester film, and after the mixed cellulose ester was dissolved, the graphene oxide film was transferred to a glass substrate or a plastic substrate, and finally the graphene film was successfully obtained after chemical reduction and thermal annealing treatment (Nature nanotech, 2008, 3 (5): 270-274).

(2) Spraying Method

The spraying method includes spraying a graphene dispersion liquid on a preheated substrate by a spray gun, and volatilizing the solvent to obtain a graphene film. Gilje et al. sprayed graphene oxide dissolved in water onto a $SiO_2$/Si substrate by the spraying method, and obtained a graphene film after reduction (Nano Lett, 2007, 7(11):3394-3398).

(3) Spin Coating Method

The spin coating method includes dropping a graphene solution onto a rotating substrate, adjusting the rotation speed of the substrate such that the graphene solution can spread evenly on the substrate, and drying to obtain a graphene film. Robinson et al. dropped a graphene oxide suspension onto a $SiO_2$/Si substrate and dried it with $N_2$, to obtain a smooth graphene film (Nano Lett, 2008, 8(10): 3441-3445).

(4) Electrophoresis Method

Graphene oxide has many polar oxygen-containing groups, so it has good suspension in polar solvents and can be charged. Graphene oxide films can be prepared by electrophoresis of graphene oxide suspension. Graphene can be charged and become a stable suspension after being treated. Under certain conditions, graphene can also be electrophoretically co-deposited with polymers to obtain composite films. Wu et al. obtained a graphene/isopropyl alcohol dispersion by ultrasonic treatment, the graphene sheet can be positively charged by adding a magnesium nitrate aqueous solution, and then a graphene film can be formed on the surface of an ITO conductive glass by electrophoretic deposition (Adv Mater, 2009, 21(17): 1756-1760).

(5) Self-Assembling Method

The self-assembly method makes use of the physical and chemical properties at the interface where graphene is located, to allow graphene to be spontaneously arranged and combined at the interface. Chen et al. synthesized a graphene oxide thin film by the self-assembling method. A graphene oxide suspension is heated in a constant-temperature water bath to form a condensed film at the liquid-air interface, and then the suspension below the film is poured out, and the film was dried to obtain a graphene oxide film (Adv Mater, 2009, 21(29):3007-3011).

Although the above methods can realize the large-scale preparation of graphene, they also have unavoidable problems. The vacuum filtration method is simple and efficient, but the existing vacuum filtration method can only orient graphene horizontally, but can't control the orientation of graphene (002) plane, that is, it can't spread graphene horizontally as much as possible. Therefore, although the graphene film obtained by vacuum filtration has a layered structure at a micron scale, the basic element graphene at nano scale will produce many folds as being forcibly compressed by an external force. The existence of folds greatly increases the internal gap and specific surface area of the graphene film, and increases the contact resistance between sheets and the scattering of phonons, which eventually leads to loss of electrical and thermal conductivities. Large-area graphene films can be prepared by spraying and suspension coating, but the microstructure of the graphene films is disordered, and the irregular stacking of the basic element graphenes results in great contact resistance and phonon scattering, which leads to poor electrical and thermal conductivities of the graphene films. Electrophoresis is easy to operate, easy to control, low in cost, and suitable for large-scale preparation, the prepared film is relatively uniform, but the basis element graphene is free-oriented, and many graphene edges are exposed on the surface of the graphene film, indicating that there is great contact resistance and phonon scattering between sheets. In addition, after using electrophoresis to form a film, it will encounter many inconveniences when transferring the film from the electrode. The self-assembling method is simple to operate, and can allow graphene oxide to be tiled on the liquid surface to form a film, the (002) planes of graphene oxide are parallel to each other, and the obtained graphene oxide film has good uniformity and controllability. However, due to the use of graphene oxide as the intermediate, the subsequent complex reduction treatment will destroy the original regularly tiled microstructure, resulting in the loss of electrical and thermal conductivities.

SUMMARY

In order to overcome the shortcomings of the prior art, the object of the present invention is to provide a method for forming a graphene film through horizontally tiling and self-assembling graphene, which is simple to operate, high in preparation efficiency and low in cost, and can obtain graphene films with (002) planes of graphene parallel to each other at the microscopic level.

In order to achieve the above object, the present invention adopts the following technical solution:

The present invention discloses a method for forming a graphene film through horizontally tiling and self-assembling graphene, the method including: proportionally adding toluene and alcohol into a graphene aqueous solution to be fully and uniformly mixed; then pouring the mixture into a vacuum filtration device, wherein when a solution in a filter flask forms a layered solution system with upper and lower layers, graphene is confined at an interface and tiled horizontally under a shear force at the interface to allow (002) planes of graphene to gradually become parallel to the interface, and graphene to be self-assembled to form the graphene film; and activating the suction filtration device to remove the solution, to obtain a graphene film with the (002) planes parallel to each other at a microscopic level on a filter paper.

Preferably, the method for forming a graphene film through horizontally tiling and self-assembling graphene includes:

step 1 of dispersing graphene in water and performing ultrasonic treatment to obtain a graphene suspension;

step 2 of proportionally adding toluene, alcohol and water into the graphene suspension, and then mixing thoroughly to obtain a mixture A;

step 3 of ultrasonically oscillating the mixture A for a short time to uniformly mix the mixture A, and immediately pouring the mixture A into a vacuum suction filtration device, wherein when the mixture A under observation is layered, and the graphene is transferred to the interface until being totally confined at the interface, the graphene is spontaneously horizontally tiled and drifted freely under an interfacial shear force, and the (002) planes of graphene gradually become parallel to the interface while graphene undergoes highly oriented self-assembling;

step 4 of activating the vacuum filtration device to remove the solution after the self-assembling is completed to form a stable and uniform graphene film at the interface, to allow the graphene film at the interface to slowly descend as a whole and to be finally completely attached to a surface of a filter paper; and step 5 of drying the filter paper to obtain the graphene film with (002) planes of graphene parallel to each other at a microscopic level.

Further preferably, in the step 1, a concentration of graphene in the graphene suspension is 0.01-2 mg/mL.

Further preferably, in the mixture A, a volume ratio of water to toluene is greater than or equal to 1:8, and a volume ratio of alcohol to toluene is 1:8-2:1.

Further preferably, in the step 3, the mixture A is treated for 5-30 seconds under an ultrasonic power of 30 W to 60 W.

Further preferably, in the step 3, the mixture A under observation is layered after a waiting time of 0.5-5 min.

Further preferably, in the step 5, the drying is performed at a temperature of 25-80° C. for 2-24 hours.

Further preferably, the method further comprises: repeating the step 2 to the step 4, to control a thickness of the graphene film by controlling layer stacking times.

Compared with the prior art, the present invention has the following beneficial effects:

According to the method disclosed by the present invention, the microscopic assembled structure of the graphene film can be effectively regulated and controlled, and graphene can be horizontally tiled as much as possible, so that a graphene film with (002) planes of graphene parallel to each other at a microscopic level is formed; The whole process is a physical process with no chemical reaction and thus is very simple in process. The toluene and alcohol used are cheap and can be reused after purification. The required equipment is only an ordinary vacuum filtration device with a low cost. There is no waste of raw materials in the process of film making, with a yield of 100%. Graphene is directly used, which avoids the subsequent reduction reaction required when using graphene oxide and has good product quality. The whole production cycle takes only a few minutes, the production efficiency is high, and it is suitable for industrial production.

As for the graphene film prepared by the invention, (002) planes of graphene are parallel to each other at the microstructure level, and the whole graphene film is uniform and compact macroscopically. In the field of transparent conductive films, compared with the ordinary vacuum filtration methods, the light transmittance of the transparent conductive film is greatly improved and the square resistance is reduced after adopting the invention. In the fields of electromagnetic shielding films, heat conducting and radiating films and gas sealing films, compared with the ordinary vacuum filtration methods, the square resistance of graphene films is reduced, and the thermal conductivity and air tightness are obviously improved after adopting the invention. According to the invention, the whole film forming steps can be repeated many times in the same area, and the thickness of the graphene film is controlled by controlling the times of layer-on-layer superpositions, so that the thickness can be accurately adjusted.

DESCRIPTION OF EMBODIMENTS

Figure 1:
FIG. 1 shows a layered state of a mixed solution system after standing by for 2 min in a vacuum filtration device in the present invention.

In order to enable a person skilled in the art to better understand the solutions of the present invention, the technical solutions in the embodiments of the present invention will be described clearly and completely with reference to the drawings in the embodiments of the present invention. Apparently, the described embodiments are only part of the embodiments of the present invention, not all of them. Based on the embodiments of the present invention, all other embodiments obtained by those skilled in the art without creative labor should fall into the protection scope of the present invention.

In addition, the terms "including" and "having" and any variations thereof are intended to cover non-exclusive inclusion. For example, a process, method, system, product or equipment including a series of steps or units need not to be limited to those steps or units explicitly listed, but may include other steps or units not explicitly listed or inherent to these processes, methods, products or equipment.

The invention will be described in further detail with reference to the accompanying drawings:

The invention provides a method for forming a graphene film through horizontally tiling and self-assembling graphene, which comprises the following steps:

a) graphene is dispersed in water, and ultrasonic treatment is performed to enable graphene to form a stable suspension in a short time, the concentration of graphene being 0.01-2 mg/ml, preferably 0.5-1 mg/ml;

b) a certain amount of the suspension in step a) is taken out, water, alcohol and toluene are added, and the use amounts of the three liquids are adjusted to achieve a predetermined proper volume ratio among the three liquids to obtain a mixture A, the volume ratio of water to toluene should be greater than or equal to 1:8 without an upper limit, the volume ratio of alcohol to toluene is between 1:8 and 2:1, and the preferred volume ratio of water, alcohol and toluene is 1:1:2;

c) the mixture A was ultrasonically oscillated to be mixed uniformly in a short time, and then poured into a suction filtration device, the ultrasonic power is between 30 W and 60 W, and the time is between 5-30 s;

d) within a few minutes, the mixture A is layered, and graphene is gradually transferred to the interface, and finally all of the graphene is confined at the interface; at the same time, graphene reaching the interface is spontaneously horizontally tiled and drifts freely under the action of interfacial shear force, and the planes (002) gradually become parallel to the interface while the graphene undergoes highly oriented self-assembling; the waiting time is 0.5-5 min, and the preferred waiting time is 1-2 min;

e) after the self-assembling is completed, a stable and uniform graphene film is formed at the interface, which is even and flat when viewed from the side and has a stable structure;

f) the suction filtration device is activated to suction out the solution, the graphene film at the interface slowly descends as a whole and is finally completely attached to the surface of the filter paper; and g) the filter paper is dried to obtain a graphene film with (002) planes of graphene parallel to each other on the microscopic level; the drying temperature is 25-80° C., and the preferred temperature is 60° C.; the drying time is 2-24 hours, and the preferred time is 12 hours.

Example 1 a) Highly conductive graphene (TNERGO-50, Chengdu organic chemistry co., ltd., Chinese academy of sciences) was dispersed in water and subjected to ultrasonic treatment to form a stable suspension in a short time, and the graphene concentration was 1 mg/mL;

b) 1 mL of the suspension prepared in step a) was taken out, water, alcohol and toluene were added therein, and the use amounts of the three liquids were adjusted to achieve a predetermined proper volume ratio of 1:1:2 to obtain a mixture A;

c) the mixture A was ultrasonically oscillated to be mixed uniformly in a short time, and then poured into a suction filtration device; the ultrasonic power was 45 W and the time is 15 s;

d) within 2 minutes, the mixture A was layered, and graphene was gradually transferred to the interface, and finally all of the graphene was confined at the interface; at the same time, graphene reaching the interface was spontaneously horizontally tiled and drifted freely under the action of interfacial shear force, and the (002) planes tended to be parallel to the interface, and at the same time, the graphene underwent highly oriented self-assembling;

e) after the self-assembling was completed, a stable and uniform graphene film was formed at the interface as shown in FIG. 1; the graphene film was even and flat when viewed from the side and had a stable structure;

f) the suction filtration device was activated, the solution was pumped out, the graphene film slowly at the interface descended as a whole and was finally completely attached to the surface of the filter paper;

g) steps b)-f) were repeated, and 5 layers in total were subjected to suction filtration;

h) the filter paper was dried at 60° C. for 12 hours to obtain a graphene film No. ① with graphene (002) planes parallel to each other at the microscopic level;

i) 5 mL of the suspension obtained in step a) was taken out, the same suction filtration device was used for direct suction filtration to form a film, which was dried at 60° C. for 12 h to obtain a graphene film No. ②.

Figure 2:
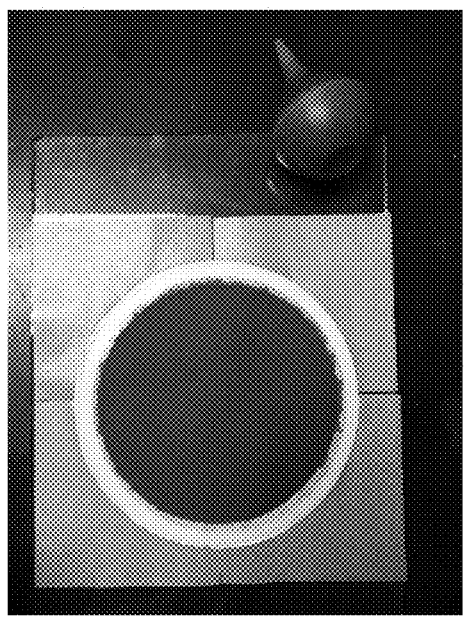
FIG. 2 is a graphene film with (002) planes parallel to each other at the microscopic level obtained after suction filtration for 5 layers.

The square resistances of graphene films with two different microstructures were measured, which was 3.34Ω/□ for ① and 10.04Ω/□ for ②. The result is as shown in FIG. 2, from which it can be seen that in this example, the square resistance of the graphene film of the present invention is reduced by two-thirds by adjusting the microstructure of the graphene film, thus significantly improving the electrical conductivity.

Example 2 a) A electrically conductive and thermally conductive graphene (SE1233, Changzhou Sixth Element Materials Technology Co., Ltd.) was dispersed in water and subjected to ultrasonic treatment to form a stable suspension in a short time, and the graphene concentration was 1 mg/mL;

b) 1 mL of the suspension prepared in step a) was taken out, water, alcohol and toluene were added therein, and the use amounts of the three liquids were adjusted to achieve a predetermined proper volume ratio of 2:1:4 to obtain a mixture A;

c) the mixture A was ultrasonically oscillated to be mixed uniformly in a short time, and then poured into a suction filtration device; the ultrasonic power was 45 W and the time was 15 s;

d) within 2 minutes, the mixture A was layered, and graphene was gradually transferred to the interface, and finally all of graphene was confined at the interface; at the same time, graphene reaching the interface spontaneously was horizontally tiled and drifted freely under the action of interfacial shear force, and the (002) planes tended to be parallel to the interface, and at the same time, the graphene underwent highly oriented self-assembling;

e) after the self-assembling was completed, a stable and uniform graphene film was formed at the interface; the graphene film was even and flat when viewed from the side and had a stable structure;

f) the suction filtration device was activated, the solution was pumped out, the graphene film at the interface slowly descended as a whole and was finally completely attached to the surface of the filter paper;

g) steps b)-f) were repeated, and 5 layers in total were subjected to suction filtration;

h) the filter paper was dried at 60° C. for 12 hours to obtain a graphene film No. ① with graphene (002) planes parallel to each other at the microscopic level;

i) 5 mL of the suspension obtained in step a) was taken out, the same suction filtration device was used for direct suction filtration to form a film, which was dried at 60° C. for 12 h to obtain a graphene film No. ②.

The square resistances of the graphene films with two different microstructures were measured, which was 26.24Ω/□ for ① and 42.15Ω/□ for ②. The result is shown in FIG. 2, from which it can be seen that in this example, the square resistance of the graphene film of the present invention is reduced by 40% by adjusting the microstructure of the graphene film, thus significantly improving the electrical conductivity.

Figure 3:
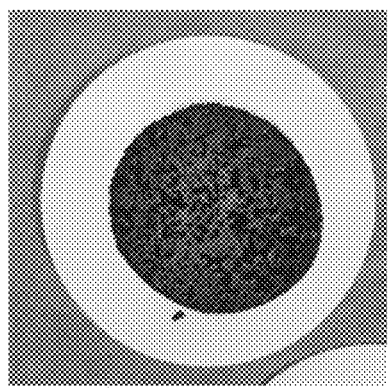
FIG. 3 is a comparison diagram of films obtained by an ordinary suction filtration method (a) and the method (b) of the present invention with the same amount of graphene.
Figure 3:
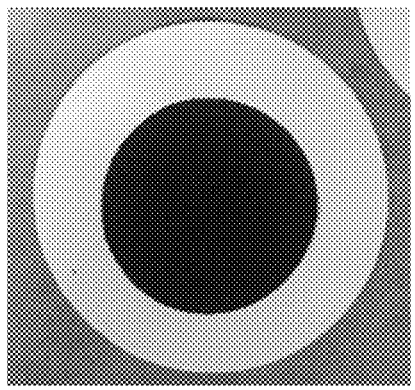

Referring to FIG. 3, a comparison diagram of the films obtained by an ordinary suction filtration method (a) and the method of the present invention (b) with the same amount of graphene shows that the coverage area of the film obtained by the method of the present invention is much larger than the film obtained by the ordinary suction filtration method, suggesting that the present invention has the effect of promoting graphene sheets to be tiled horizontally as much as possible (the 002 planes are parallel to each other).

The above content is only to illustrate the technical concept of the present invention, and is not intended to limit the protection scope of the present invention. Any modification made on the basis of the technical solution according to the technical concept proposed by the present invention falls within the protection scope of the claims of the present invention.

What is claimed is:

1. A method for forming a graphene film through horizontally tiling and self-assembling graphene, comprising:
    proportionally adding toluene and alcohol into a graphene aqueous solution to be fully and uniformly mixed;
    then pouring the mixture into a vacuum filtration device, wherein when a solution in a filter flask forms a layered solution system with upper and lower layers, graphene is confined at an interface and tiled horizontally under a shear force at the interface to allow (002) planes of graphene to gradually become parallel to the interface, and graphene to be self-assembled to form the graphene film; and activating the suction filtration device to remove the solution, to obtain a graphene film with the (002) planes parallel to each other at a microscopic level on a filter paper.

2. The method for forming a graphene film through horizontally tiling and self-assembling graphene according to claim 1, comprising:
    step 1 of dispersing graphene in water and performing ultrasonic treatment to obtain a graphene suspension;
    step 2 of proportionally adding toluene, alcohol and water into the graphene suspension, and then mixing thoroughly to obtain a mixture A;
    step 3 of ultrasonically oscillating the mixture A for a short time to uniformly mix the mixture A, and immediately pouring the mixture A into a vacuum suction filtration device, wherein when the mixture A under observation is layered, and the graphene is transferred to the interface until being totally confined at the interface, the graphene is spontaneously horizontally tiled and drifted freely under an interfacial shear force, and the (002) planes of graphene gradually become parallel to the interface while graphene undergoes highly oriented self-assembling;
    step 4 of activating the vacuum filtration device to remove the solution after the self-assembling is completed to form a stable and uniform graphene film at the interface, to allow the graphene film at the interface to slowly descend as a whole and to be finally completely attached to a surface of the filter paper; and
    step 5 of drying the filter paper to obtain the graphene film with (002) planes of graphene parallel to each other at a microscopic level.

3. The method for forming a graphene film through horizontally tiling and self-assembling graphene according to claim 2, wherein in the step 1, a concentration of graphene in the graphene suspension is 0.01-2 mg/mL.

4. The method for forming a graphene film through horizontally tiling and self-assembling graphene according to claim 2, wherein in the mixture A, a volume ratio of water to toluene is greater than or equal to 1:8, and a volume ratio of alcohol to toluene is 1:8-2:1.

5. The method for forming a graphene film through horizontally tiling and self-assembling graphene according to claim 2, wherein in the step 3, the mixture A is treated for 5-30 seconds under an ultrasonic power of 30-60 W.

6. The method for forming a graphene film through horizontally tiling and self-assembling graphene according to claim 2, wherein in the step 3, the mixture A under observation is layered after a waiting time of 0.5-5 min.

7. The method for forming a graphene film through horizontally tiling and self-assembling graphene according to claim 2, wherein in the step 5, the drying is performed at a temperature of 25-80° C. for 2-24 hours.

8. The method for forming a graphene film through horizontally tiling and self-assembling graphene to claim 2, further comprising: repeating the step 2 to the step 4 to control a thickness of the graphene film by controlling layer stacking times.

* * * * *